June 3, 1930. W. E. RAWLINGS 1,761,680
FLOAT
Filed March 31, 1928

INVENTOR
William E. Rawlings

Patented June 3, 1930

1,761,680

UNITED STATES PATENT OFFICE

WILLIAM E. RAWLINGS, OF SAN JOSE, CALIFORNIA

FLOAT

Application filed March 31, 1928. Serial No. 266,351.

My invention relates to improvements in floats and the objects of my improvement are to provide an amusement device for bathers, and to provide a float utilizing the inner tube of an automobile tire for buoyancy. Other objects are to provide a hinged frame and seat of wood, clamps for holding the tube in place, handles for the bather, and adjusting means. Another object is to provide a float that may be folded into small compass, and so carried easily from one place to another.

I attain these objects by the means illustrated in the accompanying drawing, in which—

Figure 1:
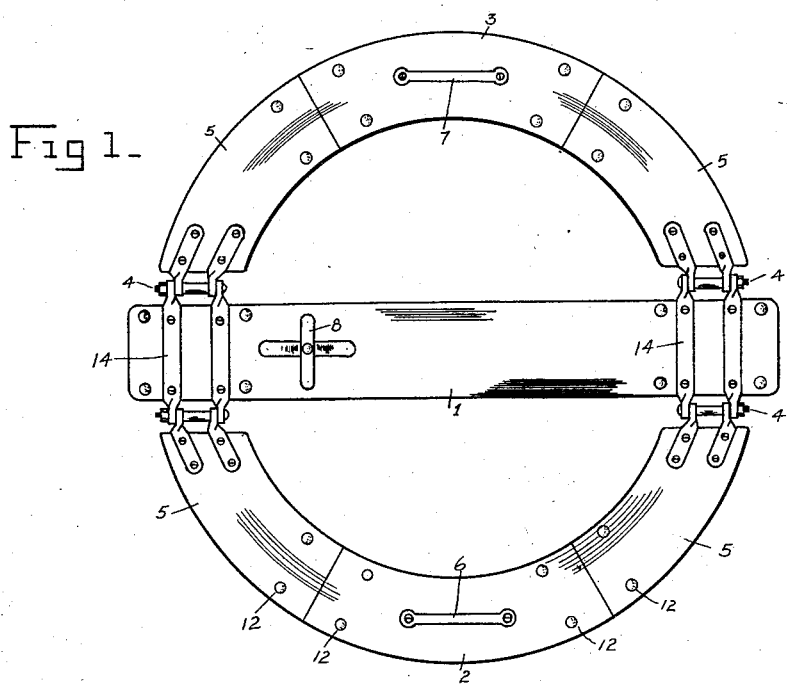
Figure 2:
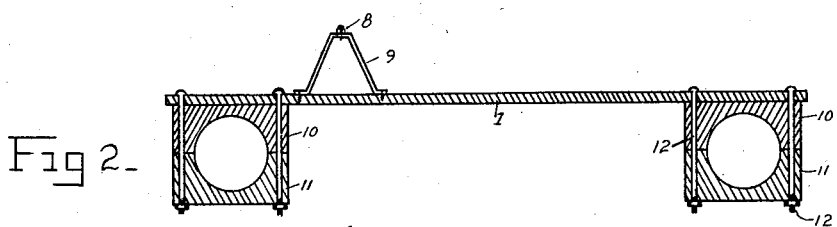
Figure 3:
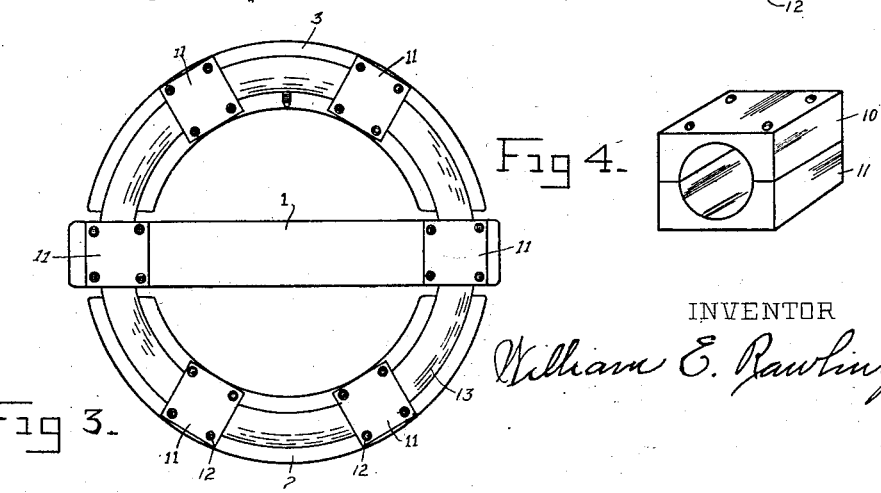
Figure 4:
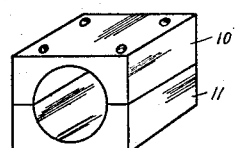

Figure 1 is a top view of the float,
Fig. 2 is a longitudinal section,
Fig. 3 is a bottom view, and
Figure 4 is a perspective of one of the tire clamps.

The float consists, essentially, of a circular wooden frame or ring, with a board seat athwart it, and an inflated tire tube clamped beneath. To the seat 1 are hinged lateral wings 2 and 3, which may be set at any desired angle to the seat 1 and locked by tightening the nuts on bolts 4. This means of adjustment makes it possible to elevate the wings 2, 3 with relation to the seat 1 with greater resulting stability for the float. The same adjusting means permits the float to be folded into small compass for transportation.

The wings preferably consist of several sections 5 for the sake of economy, since to saw the whole wing from a single board would require a wide, expensive board, and also produce much waste. Handles 6 and 7 enable the bather to retain his hold on the float even in rough breakers. An additional handle bar 8 supported by standard 9 may also be attached to the forward end of the seat.

Bolted to the wings and to the ends of the seat board 1 are clamping members consisting of wooden blocks 10, 11 brought together by bolts 12. These blocks are tunneled to permit the inner tube to pass through them. The tube 13 may be exchanged by removing the nuts from bolts 12 and taking off blocks 11. Six clamping members are shown in the drawing, but a greater or less number may obviously be used if desired without departing from the spirit of the invention.

The seat and wings are preferably made of wood for buoyancy and economy, but aluminum or other light material might be used. Another style of hinge 14, or of standard 9 might also, of course, be used; or the general shape of the float might be hexagonal or octagonal instead of circular without departing from the spirit of my invention.

I claim:

1. A float having in combination an annular frame, a seat athwart said annular frame and hinged to said frame, clamps bolted to the underside of said frame, an annular inflatable tube retained by said clamps, handles on said annular frame and a handle bar mounted upon a standard arising from said seat.

2. A float having a seat, sectional wings hinged to said seat, means for adjusting and clamping the wings at any desired angle of elevation with relation to said seat, an inflated tube beneath the float, and means for clamping said tube to said float.

3. A float comprising a seat, wing portions hingedly mounted on opposite sides of the seat, means for securing the wings at any desired angle relative to the plane of the seat, and an annular inflatable tube secured to the wings and traversing the ends of the seat.

4. A float comprising a seat, wing portions hingedly mounted on opposite sides of the seat at their ends but spaced from the seat intermediate their ends, means for securing the wings at any desired angle relative to the plane of the seat, and buoyant means secured to the float.

In testimony whereof, I hereby affix my signature.

WILLIAM E. RAWLINGS.